United States Patent
Mol et al.

(10) Patent No.: US 9,863,477 B2
(45) Date of Patent: Jan. 9, 2018

(54) STEEL BEARING

(71) Applicant: AKTIEBOLAGET SKF, Gothenburg (SE)

(72) Inventors: Hendrik Anne Mol, Sleeuwijk (NL); Babak Hosseinkhani, The Hague (NL); Hendrik Johannes Krock, Sleeuwijk (NL)

(73) Assignee: AKTIEBOLAGET SKF, Gothenburg (SE)

(*) Notice: Subject to any disclaimer, the term of this patent is extended or adjusted under 35 U.S.C. 154(b) by 3 days.

(21) Appl. No.: 15/034,087

(22) PCT Filed: Nov. 5, 2013

(86) PCT No.: PCT/EP2013/072990
§ 371 (c)(1),
(2) Date: May 3, 2016

(87) PCT Pub. No.: WO2015/067294
PCT Pub. Date: May 14, 2015

(65) Prior Publication Data
US 2016/0290403 A1    Oct. 6, 2016

(51) Int. Cl.
*F16C 33/48* (2006.01)
*F16C 41/00* (2006.01)
(Continued)

(52) U.S. Cl.
CPC .............. *F16C 41/007* (2013.01); *C21D 9/40* (2013.01); *F16C 19/06* (2013.01); *F16C 33/586* (2013.01);
(Continued)

(58) Field of Classification Search
CPC .......... F16C 19/06; F16C 41/007; C21D 9/40; C21D 2221/00
See application file for complete search history.

(56) References Cited

U.S. PATENT DOCUMENTS

| 5,200,697 A | 4/1993 | Adler |
| 2011/0158571 A1* | 6/2011 | Furusawa ............... F16C 33/64 384/589 |
| 2012/0312781 A1 | 12/2012 | Van De Sanden et al. |

FOREIGN PATENT DOCUMENTS

| DE | 19703832 A1 | 8/1998 |
| DE | 102010022369 A1 | 12/2011 |
| EP | 1790985 A1 | 5/2007 |

OTHER PUBLICATIONS

Ara K et al: "Formation of Magnetic Grating on Steel Plates by Electron/Laser Beam Irradiation", IEEE Transactions on Magnetics, IEEE Service Center, New York, NY, US, vol. 25, No. 5, Sep. 25, 1989.

* cited by examiner

*Primary Examiner* — Phillip A Johnson
(74) *Attorney, Agent, or Firm* — Bryan Peckjian; SKF USA Inc. Patent Dept.

(57) ABSTRACT

The present invention relates to a bearing assembly that provides a magnetic sensor; a shaft; and a bearing. One of the shaft and the bearing is provided with a surface having a bearing steel and including a magnetic pattern disposed thereon for indicating a rotation of the shaft relative to the bearing. The magnetic pattern is provided by the microstructure of the surface; and the sensor is arranged to sense the pattern and output a signal indicative of a rotation of the shaft relative to the bearing.

14 Claims, 3 Drawing Sheets

(51) Int. Cl.
     *C21D 9/40*          (2006.01)
     *F16C 33/58*        (2006.01)
     *F16C 19/06*        (2006.01)

(52) U.S. Cl.
     CPC ...... *C21D 2221/00* (2013.01); *F16C 2223/12* (2013.01); *F16C 2223/16* (2013.01)

STEEL BEARING

CROSS-REFERENCE

This application is the U.S. National Stage of International Application No. PCT/EP2013/072990 filed on Nov. 5, 2013, which is incorporated herein by reference in its entirety.

TECHNICAL FIELD

The present invention relates generally to the field of steel metallurgy and, in particular, to an improved bearing assembly. The improved bearing assembly allows for the measurement of the relative orientation or rotational speed of components of the assembly by observation and measurement of the magnetic properties of a surface which moves relative to a sensor.

BACKGROUND

Bearings are devices that permit constrained relative motion between two parts. Rolling element bearings, for example, typically comprise inner and outer raceways and a plurality of rolling elements (for example balls and/or rollers) disposed therebetween.

Bearings are used in a wide number of applications and it is often essential to be able to measure the relative orientation or rotational speed of the parts. For example, an ABS system can operate by measuring slip or stoppage of the surfaces within a bearing, compared to the expected rotation rate. A variance from the expected rotational speed would demonstrate a loss of traction and engage the ABS system.

It is known to use magnetic sensor systems in bearings to determine the relative orientation. An example of such a bearing assembly is shown in FIG. 1 which has a magnetic ring (a "tone" ring) attached to a portion of a rotating part of a bearing. The tone-ring is attached to the rotating surface in an off-centre manner, as shown in FIG. 2. Since the sensor is stationary, the magnetic field strength that it records will vary with the relative overlap between the sensor and the ring. This allows for accurate measurement of the rotational orientation of the relative parts of the bearing. In this way the number and frequency (RPM) of rotation can be determined.

The use of a tone ring, or an equivalent, such as a magnetic seal or disc (which relies on so-called variable reluctance) is well known. Indeed, the technology is commonplace in wheel speed sensors (ABS) for cars, trucks, and some railway applications. It is also commonplace for combustion engine crank and cam shaft position detection and in steer units, electric motor control and commutation sensor bearings.

The magnetic rings which are used in these known applications are typically manufactured in one of two different methods. According to the first method a magnetic material is sintered to form a ring. According to the second method, particles of magnetic material are mixed with polymers or elastomers, and then pressure moulded into a ring shape and, if necessary, vulcanised. The resulting rings are magnetised into the number of pole pairs needed. Typically, the polymers or elastomers are selected for their ease of mounting and to improve the mechanical strength of the ring.

The magnetic materials commonly used vary from simple ferrites (a form of magnetite, using barium or strontium to improve their qualities), to more expensive rare-earth-metal-based powders. Examples of suitable magnetic materials are well known in the art and include, for example, Neodymium-Dysprosium-Iron-Boron, Samarium Cobalt, Samarium Iron Nitride (SmFeN), or amalgamations of SmFeN and FeCo.

U.S. Pat. No. 5,200,697 discloses a bearing assembly having a tone ring for sensing the speed of rotation in a bearing.

It is an object of the present invention to provide an improved bearing assembly and to address some of the problems associated with the prior art, or at least to provide a commercially useful alternative thereto.

SUMMARY OF THE INVENTION

According to a first aspect, there is provided a bearing assembly comprising:
 a magnetic sensor;
 a shaft; and
 a bearing,
 wherein one of the shaft and the bearing is provided with a surface comprising a steel and having a magnetic pattern thereon for indicating a rotation of the shaft relative to the bearing, wherein the magnetic pattern is provided by the microstructure of said surface; and
 the sensor is arranged to sense the pattern and output a signal indicative of a rotation of the shaft relative to the bearing.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The present invention relates to a bearing assembly comprising a shaft and a bearing. These are commonly made of steels that can be hardened to have ideal properties for such hard-wearing applications.

The invention relates to the provision of a magnetic sensor arranged to sense a pattern provided on a surface of the shaft or the bearing. Such sensors are well known in the art. Examples of such sensors include hall sensors and magneto resistors.

The pattern preferably has regularly varying magnetic properties. The inventors have found that this can be achieved by regular alternation of the microstructure of the steel. The area having the varying alternation may be on or under the surface of the surface but will be measured by a sensor scanning the surface. The sensor is arranged to sense the pattern and to output a signal indicative of a rotation of the rotating part of the bearing (generally the shaft) relative to the stationary part of the bearing. This allows for ready measurement of rotational velocities.

The assembly described herein relies on a magnetic sensor arranged so that, in use, a moving surface passes before the sensor. This allows the sensor to scan the moving surface and to thereby determine properties of the moving surface. In a simple embodiment, the sensor can record every time that a particular portion of the rotating surface passes the sensor and, therefore, count rotations. In a more complex embodiment, the information provided on the surface can be sufficiently detailed (or unique) to allow for accurate orientation measurement of the relative position of the moving surface.

The inventors have realised that the magnetic pattern can be provided integrally to one of the components of a bearing assembly, provided that the component comprises bearing steel. The magnetic properties of bearing steel are different for each structure type, such as, for example, alpha ferritic, austenitic, bainitic and martensitic microstructures.

In particular, they have realised that the different magnetic properties of different steel microstructures provides an opportunity to incorporate a pattern into a surface of one of the components. This is achieved by producing regions or domains having different microstructures. For example, in a substantially martensitic shaft, portions of the surface can be converted into austenite using differential induction hardening, micro-alloying, case carburising, or even a thermal laser.

The sensor can detect the variance between these different microstructural regions. Moreover, the surfaces of a bearing assembly made out of bearing steel provide an opportunity to adapt the microstructure locally near the surfaces to vary the magnetic properties measureable across a surface to provide identifying information relating to rotation or orientation.

The sensor is used to scan a "surface" of a shaft or bearing (preferably the bearing). The sensor measures the magnetic properties of the microstructure relative to the surface that it is arrange to scan. As will be appreciated, the microstructure comprises crystal-lattice structures formed in the material of the bearing assembly component. These extend into the body of the component, since, of course, the structures have a three-dimensional form. Furthermore, the actual microstructural portions which give rise to the surface pattern need not be directly adjacent to the surface upon which they serve to provide the magnetic pattern. That is, the microstructural regions may be within the body of the component, or provided with a protective layer or coating, provided that the magnetic properties resulting from the microstructure can be determined by a sensor set to scan said surface.

The variance in the microstructure can be varied to provide areas to different magnetic field strength. This may be achieved by having a larger region or depth of a particular microstructure. A deeper portion, for example, would allow for easier measurement of a particular property. Alternatively, there may be provided a plurality or array of sensors. By combining or comparing the readings from these sensors it may be possible to accurately determine the orientation of the assembly components.

In more detail, the present inventors have found that it is possible to provide a surface of a bearing assembly with a microstructural pattern which allows for location sensing of the orientation and/or rotation of the relative components. In particular, rather than requiring a bulky magnetic ring, as used in conventional systems, they have found that they can simply pattern the surface of a bearing component. This reduces the weight and size of the bearing assembly as it does not require additional rings to be mounted first and it allows for increased simplicity of mounting. This is due to the provision of a pattern on the bearing and not on a separate ring that must be mounted, usually arbitrarily, on the bearing. It also allows for a pattern denoting a unique orientation and/or visible marking. Furthermore, the longevity of the simpler assembly is significantly improved. There is no risk, for example, of the tone ring detaching, wearing or breaking.

By way of an example, the steels typically used in bearings have a high content of martensitic or bainitic structure. Martensitic structure has high permeability like soft (ferritic) steel, while austenitic material is nonmagnetic and thus has a low permeability (close to 1). If the bearing with a predominantly martensitic structure is heated above the austenitising temperature, the material structure is transformed back to austenite. In this way the martensitic substrate is suitable for information writing by local thermal treatment. To achieve this transformation readily it is possible to apply local thermal treatment or to change the structure by differential induction hardening, micro-alloying, or case carburising.

In one embodiment, the bearing assembly described herein allows for angle sensing using a rolling bearing ring made with periodically varying microstructure of bearing steel as a magnetic target. By regularly varying the microstructure around the circumference of the ring, the magnetic permeability of the ring will vary accordingly. This is sensed by a sensor consisting of a magnetic field sensor (Hall sensor, Magneto resistor sensor) and a source of magnetic fields (a permanent magnet or electromagnet). The magnetic pattern will typically be provided on a non-contact surface. That is, the surfaces which are not loaded by rolling elements. The non-contact areas are more accessible for measurements.

The inventors have realised that the present invention has a broad applicability. For example the sensors can be used in electric motors and generators to control their mechanical input/output and their electrical energy input or output.

Moreover, due to the simplicity of the design, they are suitable for use in harsh conditions, such as high temperatures. This allows for high temperature and/or high speed angle sensing. This has particular utility for electric turbochargers of car engines, for start/stop engine systems and hybrid low cost electrical engines In addition, due to the low cost design, they can be used as feedback sensors in marine rudder steering sensors. In addition due to the scaleability, they can be used in angle sensing for pitch and position of large bearings in e.g. wind turbines or industrial gearbox systems.

Furthermore, there is no limit to the size of the magnetic pattern provided by the method. This is in contrast to the use of classical magnetic rings. Whereas small tone rings (less than 10 cm) are cheap to manufacture, the costs increase very rapidly with increasing diameter. The magnetic pattern is preferably generally annular. In preferable embodiments, the diameter of the magnetic pattern may be at least 12 cm. Most preferably, the diameter of the magnetic pattern may be at least 30 cm.

Preferably the bearing steel is a non-, low- and medium alloyed steel such as, for example, SAE4310, SAE 4118, SAE 8620, SAE4320, SAE1055, SAE1070, 100Cr6 (=SAE 52100), or a highly alloyed steels, such as, for example, 100CrMo7 (SKF Grade 24), 100CrMnMoSi8-4-6 (SKF Grade 7), M50 or M50NIL.

Preferably the magnetic pattern is provided by regions of increased or decreased austenite content. The relative magnetic field associated with austenite is different from that of other microstructural forms of steels. Accordingly, the relative concentration of austenitic domains in a portion of steel allows for the variance in the field strength detected by a magnetic sensor. Preferably the magnetic pattern is a regular pattern. The spacing or configuration of the pattern can be used with a precalibrated system to determine the orientation or rotation speed. Alternatively, the pattern can be irregular but can known from a pre-calibration of the ring. It is also possible for the pattern to be unique for each region or point around the ring.

Alternatively, the magnetic pattern may be a constant field strength (or regular alternation), but emanate from a varied location around the circumference of a surface. For example, on a rotating shaft a magnetic pattern may be a region of constant field strength having a varying axial position. Similarly, on a planar surface having a bore therethrough for a rotating shaft, the magnetic pattern may be a region of constant field strength having a varying radial distance from the centre of the bore.

The use of varying austenite is particularly advantageous for a number of reasons. In particular, because the austenite already forms a part of the shaft and/or the bearing, there is no increase in the mass balance of the bearing associated with the pattern. This allows for far lighter measuring systems. Moreover, any saving of weight on the moving portion of a bearing assembly can allow significant energy savings for accelerating said portion.

Preferably the magnetic pattern is provided on shaft or on a component of the bearing that rotates with the shaft.

BRIEF DESCRIPTION OF THE DRAWINGS

According to a preferred embodiment, the surface having a magnetic pattern comprises alpha-iron or ferritic and/or martensitic and/or bainitic steel having regions comprising a certain level of austenite within a ferritic matrix. This is an advantageous form because it is relatively straight-forward to provide an austenite pattern on an alpha-iron or martensitic or bainitic steel by heat treating the surface. This can be done, for example, with a laser treatment step, but also with induction hardening.

A re-hardening of already heat treated and quenched martensitic steels could locally change the austenite content. Alternatively, the soft annealed steel (in normalised and/or spherodised annealed condition) may be locally hardened.

Figure 1:
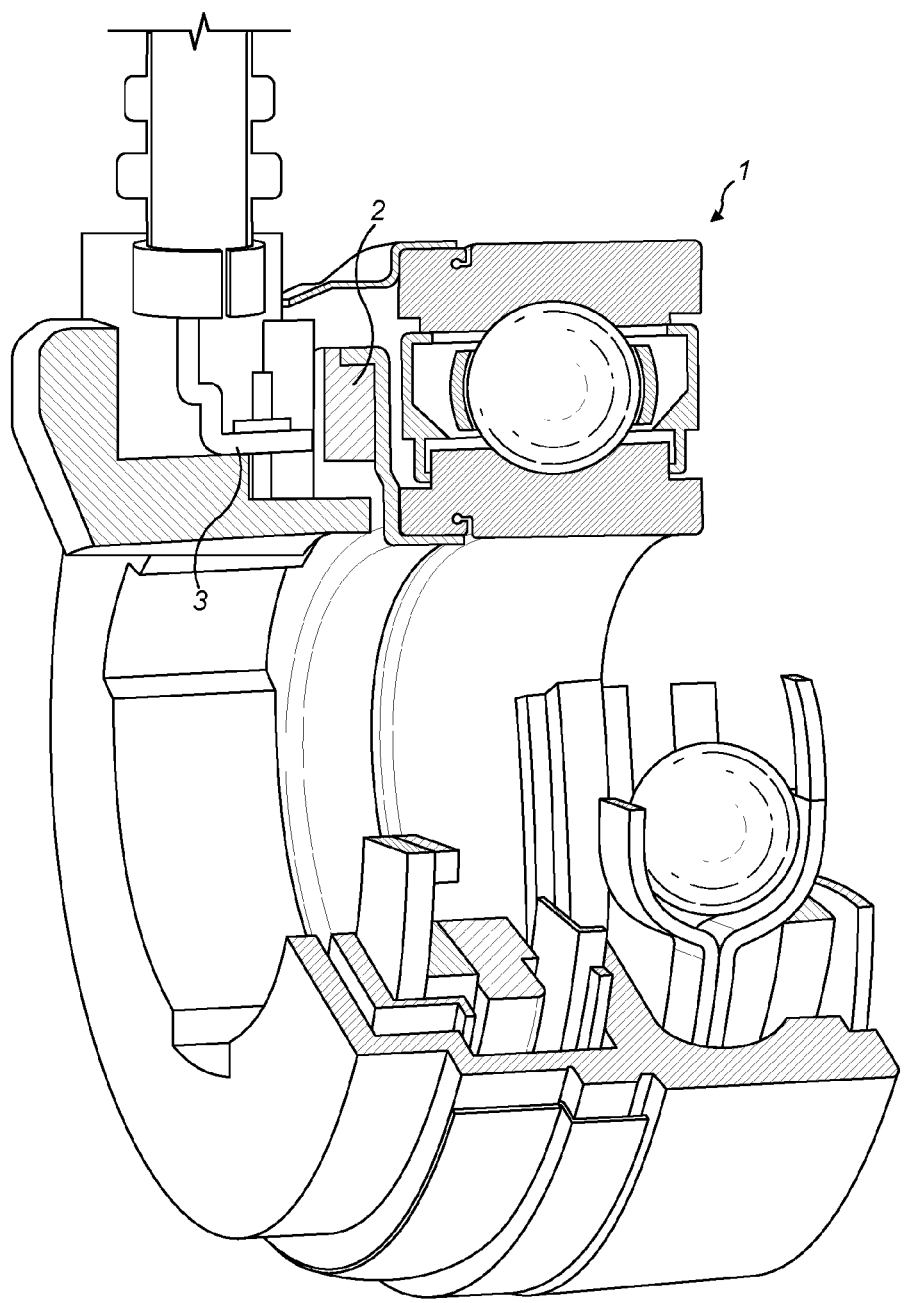

Another way to locally create different amount of austenite/ferrite mixture is the micro alloying combined with heat treatment but also by deep freezing. Examples are based on liquid Nitrogen quenching or locally re-quenching. Deep freezing may also be used if the microalloying has the wished geometric pattern of alternating areas. Nickel can be printed or deposited first on the soft steel, prior to heat treatment. The heat treatment is following the normal temperature cycle, and in the areas where nickel is present the austenites are stable. Deep freezing will increase the ferrite content in the martensite/bainite parts.

Another way to locally create different patterns is to allow carbon and/or nitrogen to diffuse in the surface layer using a finger like mask. The mask reduces the diffusion of C and/or N where the fingers are, while the open exposed parts will have faster uptake of C and/or N. In this case, the N can be beneficial as it is acting as a austenite stabiliser.

Preferably the magnetic sensor is a hall-effect sensor or a plurality or array of hall-effect sensors. These are well known in the art and provide a simple and reliable method of measuring the magnetic field strength. Alternatively, magneto resistive sensors may be employed to measure the variation of magnetic field due to the structure variations.

Preferably the magnetic pattern is provided by a controlled and regular varying austenite concentration around and in the volume under said surface. The use of a continuous pattern around a shaft or surface of the bearing allows for precise orientation determination of the relative positions of the shaft and bearing.

Preferably the surface with the magnetic pattern is provided on the shaft or on the rotating member of the plain or rolling element bearing.

According to a second aspect there is provided a method of producing a bearing assembly as described herein, the method comprising:

providing a bearing assembly comprising a magnetic sensor, a shaft and a bearing, treating one or more portions of a surface of the shaft or the bearing formed from a bearing steel to form distinct microstructural regions in said surface, wherein the sensor is arranged to sense the pattern of distinct microstructural regions.

Treatment of the surface will involve the treatment of the portion of the steel at or adjacent the surface, but also may involve the treatment of a portion of the steel below the surface but detectable at the surface of the bearing component.

Preferably the step of treating one or more portions of a surface of the shaft or the bearing to form distinct microstructural regions in said surface comprises one or more of:

thermally treating the one or more portions to form austenite in said portions; and masking the one or more portions before carbon-nitriding or carburising the surface to produce form austenite on the unmasked surface.

The following specific methods are contemplated:

1. A bearing having a surface hardened raceway, but with soft face/sides. The soft part of the ring will be mainly alpha ferritic. By use of induction or laser austenisation it is possible to create austenite rich spots, followed by quenching and tempering. The spots can be used to form a magnetic pattern that can be sensed by the sensor.

2. A bearing made from a through hardened products (suitable for alloys such as 100Cr6 and 100CrMo7) can be treated by spot austenitisation to create more austenite. This would be followed by tempering or re-tempering to reduce retained austenite on the remainder of the surface by short term treatment. E.g. 300 degrees C. in a salt bath for approximately 8 seconds, instead of 220 degrees C. for longer time (1.5 hr typical).

3. A bearing made from a through hardened products (suitable for alloys such as 100Cr6 and 100CrMo7) can be masked during carbonitriding for wear resistant surfaces. The use of mask leads to spots that should not be carbonitrided to create variation of the retained austenite.

4. A bearing made with case carburised products can also be affected by masking. This can create selectively less carburised spots by shading these spots from the carbon diffusion process (masking of spots where otherwise the carbon from atmosphere would diffuse into steel matrix and thereby create austenite). This would need to be followed by hardening and tempering.

5. A bearing made with case carburised products can also be treated to create selective high alpha-austenite-containing spots by alloying with nickel during the case carburising process.

Preferably the step of thermally treating the one or more portions is conducted with a laser.

The structure of the steel alloys may be determined by conventional microstructural characterisation techniques such as, for example, optical microscopy, TEM, SEM, AP-FIM, and X-ray diffraction, including combinations of two or more of these techniques.

FIGURES

The present invention will now be described further, by way of example, with reference to the accompany drawings in which:

FIG. 1 shows a schematic of a prior art bearing 1 with a tone ring 2 and a magnetic sensor 3.

Figure 2:
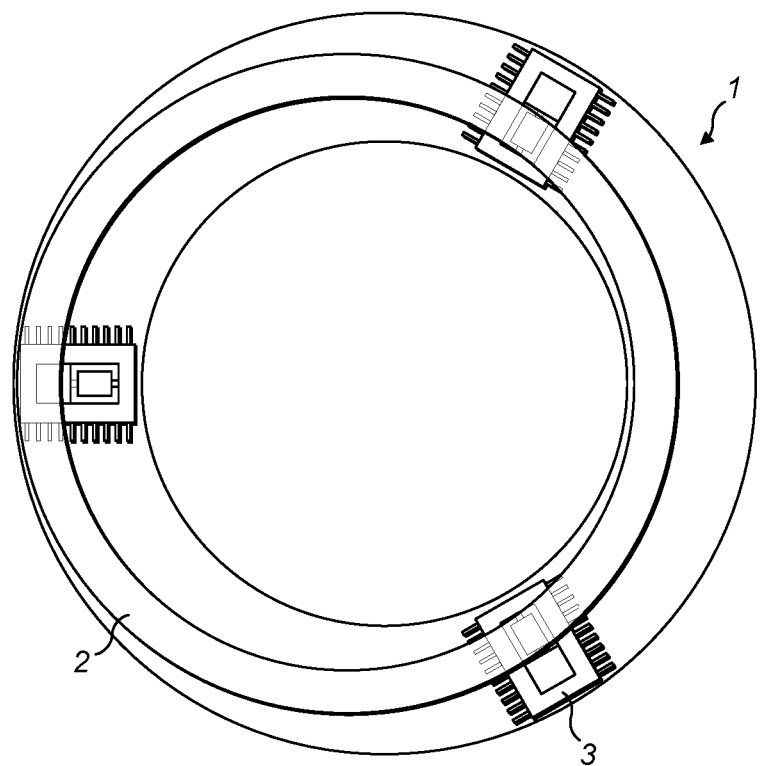

FIG. 2 shows a cross-section of a prior art bearing 1 showing the off-set configuration of a tone ring 2 relative to sensors 3.

FIG. 3 show cross-sectional diagrams of embodiments of the invention. In FIGS. 3A, 3B and 3C, a sensor is attached to a bearing to scan a patterned surface of a rotating shaft (3A and 3B) or a rotating cuff attached to the shaft (3C). In FIG. 3D, a sensor is attached to a shaft to scan a patterned surface of a rotating bearing component.

DETAILED DESCRIPTION OF THE INVENTION

Figure 3A:
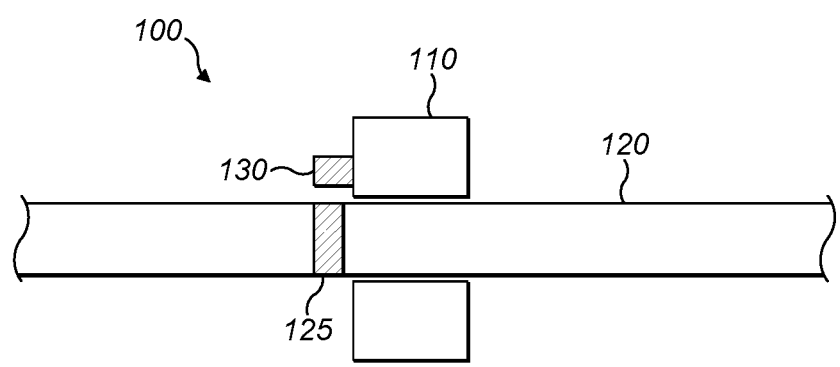

In more detail, FIG. 3A depicts a bearing assembly 100 forming a first embodiment.

Bearing assembly 100 comprises: a plain bearing 110 (or a split bearing 110); a shaft 120; and a magnetic sensor 130.

In the embodiment of FIG. 3A, the shaft 120 is provided with a magnetic pattern 125 on its surface, and a magnetic sensor 130 is mounted on the bearing assembly 100 to rotate with the plain bearing 110 relative to the shaft 120. Preferably, the sensor 130 is directly mounted on the plain bearing 110.

The sensor 130 is mounted so that a region of the magnetic pattern 125 is exposed to the sensor 130. The sensor 130 is arranged to sense relative rotation between the shaft 120 and the plain bearing 110.

The magnetic pattern 125 preferably is a regular repeating pattern around the circumference of the shaft 120. Alternatively, the magnetic pattern 125 is unique for each location around the circumference of the shaft 120. Optionally the sensor 130 outputs a unique signal for any relative rotational displacement of the shaft 120 and bearing 110. Alternatively the sensor and detection system can be calibrated to determine the location and orientation based on the measurements taken of the regular repeating pattern.

Rotation of the shaft 120 relative to the sensor 130 exposes a different region of the magnetic pattern 125 to the sensor 130. The sensor 130 can thereby output a signal indicative of the rotation of the shaft 120 relative to the plain bearing 110 or of the rotational speed of the shaft 120 relative to the plain bearing 110.

Figure 3B:
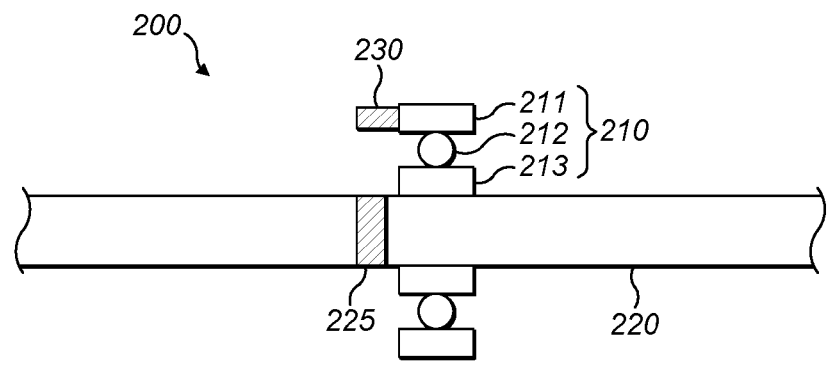

FIG. 3B depicts a bearing assembly 200 forming a second embodiment.

Bearing assembly 200 comprises: a bearing 210; a shaft 220; and a magnetic sensor 230.

The bearing 210 may be a ball bearing or a roller bearing 210. In FIG. 3B a ball bearing is shown. The bearing 210 comprises: an outer race 211; a plurality of balls 212; and an inner race 213. The inner race 213 may be mounted on the shaft 220 and rotate therewith.

In the embodiment of FIG. 3B, the shaft 220 is provided with a magnetic pattern 225 on its surface, and a magnetic sensor 230 is mounted on the outer race 211 of the bearing assembly 200 to rotate relative to the shaft 220 about the rotational axis of the shaft 220. The sensor 230 is thus arranged to sense relative rotation between the shaft 220 and the outer race 211.

Figure 3C:
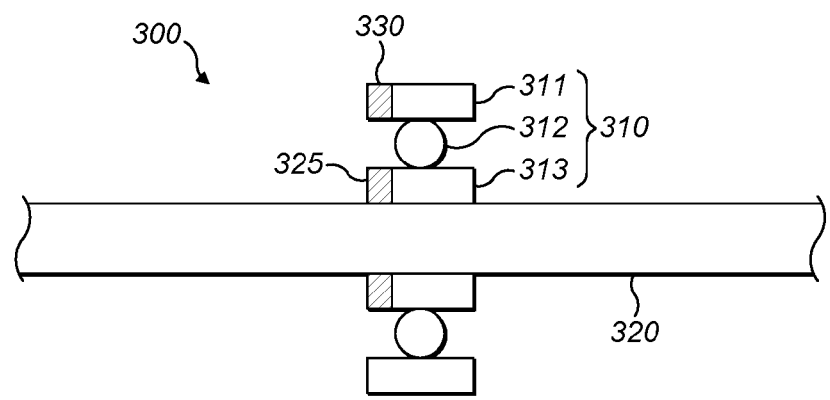

In FIG. 3C, the bearing 310 comprises: an outer race 311; a plurality of balls 312; and an inner race 313. The inner race 313 may be mounted on the shaft 320 and rotate therewith, and the sensor 330 is mounted on the outer race 311. The embodiment of FIG. 3C is substantially the same as that of FIG. 3B, except that the magnetic pattern 325 is not provided on the shaft 320, but on the inner race 313 of the bearing assembly 300.

The embodiments described above include sensors 130 mounted on the non-rotating component and magnetic patterns formed on the rotating component. Alternative embodiments are envisaged in which the sensor 130 is mounted on the shaft 120 and the magnetic pattern is provided on the plain bearing 110. Such bearings are, however, less preferable. Preferably, such sensors 130 include a commutator or produce a wireless signal for remote reception.

Figure 3D:
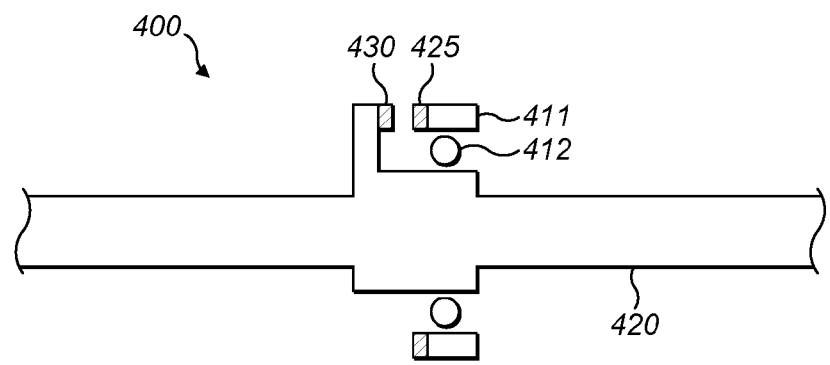

FIG. 3D depicts a bearing assembly 400 forming a first embodiment.

Bearing assembly 400 comprises: a ball bearing 410 (or a roller bearing 410); a shaft 420; and a magnetic sensor 430.

In FIG. 3D, the bearing 410 comprises: an outer race 411; a plurality of balls 412; and an inner race that may be formed integrally with the shaft 420.

In the embodiment of FIG. 3D, bearing 410 is provided with a magnetic pattern 425 on its non-contact surface, and a magnetic sensor 430 is mounted on the shaft 420 to rotate with the bearing 410 relative to the shaft 420. Preferably, the sensor 430 is directly mounted on the shaft 420. In use the shaft 420 in this embodiment, unlike the previous embodiments, is preferably stationary.

The sensor 430 is mounted so that a region of the magnetic pattern 425 is exposed to the sensor 430. The sensor 430 is arranged to sense relative rotation between the shaft 420 and the bearing 410.

The magnetic pattern 425 may vary around the circumference of the bearing 410, but is preferably a regularly repeating pattern or array. The magnetic pattern 425 can be unique for each location around the circumference of the bearing 410 and the sensor 430 can output a unique signal for any relative rotational displacement of the shaft 420 and bearing 410. Alternatively the sensor and the related system and controller can determine the rotational displacement and/or speed from precalibration with relation to a regular repeating pattern.

Rotation of the bearing 410 relative to the sensor 430 exposes a different region of the magnetic pattern 425 to the sensor 430. The sensor 430 can thereby output a signal indicative of the rotation of the bearing 410 relative to the shaft 420 or of the rotational speed of the bearing 410 relative to the shaft 420.

The magnetic pattern is preferably formed by thermal laser treatment of a bearing steel surface. Using this example, different embodiments of the magnetic pattern will be described.

Starting from a martensitic or alpha ferritic bearing steel surface, a thermal laser is used to heat portions of the surface of a shaft or bearing and to thereby form austenitic regions. These regions may, for example, be in the form of dots of varying location, varying size, varying depth and varying density, to thereby identify a unique portion of the surface. Due to the variance in the magnetic field that can be detected, the orientation and/or rotational speed can be determined. In one embodiment, the pattern may simply be a magnetic strip, similar to a tone ring in form, offset from the sensor to thereby produce a varying field strength measured by the sensor. In another, the extent of austenitic microstructure conversion of the surface can be varied to achieve measurable change in the concentration of the austenite in the surface and thereby a variance in the magnetic field.

The magnetic pattern can alternatively be formed in other ways. For example, induction heat treatment could be used to heat portions of the surface of a shaft or bearing and to thereby form austenitic regions In other embodiments, the shaft or bearing may be heated and then quenched. A patterned mask corresponding to the magnetic pattern may be used to cover a portion of the shaft or bearing surface prior to the quenching step to form regions having varying magnetic properties.

Alternatively, the shaft or bearing may be carburised or de-carburised. A patterned mask corresponding to the magnetic pattern may be used to cover a portion of the shaft or bearing surface prior to the carburisation or de-carburisation step to form regions having varying magnetic properties.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A bearing assembly comprising:
a magnetic sensor;
a shaft; and
a bearing,
wherein the shaft or the bearing is provided with a surface region comprising a bearing steel and including a magnetic pattern in the bearing steel of the surface region for indicating a rotation of the shaft relative to the bearing, wherein the magnetic pattern is provided by a microstructure of the bearing steel in the surface region; and
the sensor is arranged to sense the pattern and output a signal indicative of a rotation of the shaft relative to the bearing.

2. The bearing assembly according to claim 1, wherein the magnetic pattern is provided by regions of increased or decreased austenite content.

3. The bearing assembly according to claim 1, wherein the magnetic pattern is provided by a regular alternation in the microstructure of said surface.

4. The bearing assembly according to claim 1, wherein the magnetic pattern is provided on the shaft or on a component of the bearing that rotates with the shaft.

5. The bearing assembly according to claim 1, wherein the surface region having a magnetic pattern further comprises at least one of alpha-ferritic and martensitic steel having regions that include austenite.

6. The bearing assembly according to claim 1, wherein the magnetic sensor is a hall-effect sensor.

7. The bearing assembly according to claim 1, wherein the surface region is provided on the shaft.

8. The bearing assembly according to claim 1, wherein the diameter of the magnetic pattern is at least 12 cm.

9. The bearing assembly according to claim 1, wherein the magnetic pattern is provided by a continuously varying concentration of austenite around the bearing steel of the surface region.

10. The method of claim 9, wherein the treating comprises:
thermally treating the surface region to form austenite in portions.

11. The method of claim 10, wherein the thermally treating is conducted with a laser.

12. A bearing assembly comprising:
a magnetic sensor;
a shaft; and
a bearing,
wherein one of the shaft and the bearing is provided with a surface comprising a bearing steel and having a magnetic pattern thereon for indicating a rotation of the shaft relative to the bearing, wherein the magnetic pattern is provided by the microstructure of said surface; and
the sensor is arranged to sense the pattern and output a signal indicative of a rotation of the shaft relative to the bearing, and
wherein the magnetic pattern is provided by a continuously varying concentration of austenite around the surface.

13. A method of producing a bearing assembly comprising:
providing a shaft and a bearing;
treating a surface region of the shaft or a surface region of the bearing to produce a pattern of areas having distinct microstructures having distinct magnetic properties; and
providing a magnetic sensor configured to sense the magnetic properties of the surface regions when the surface regions rotates relative to the magnetic sensor.

14. The method of claim 13, wherein the treating comprises:
masking parts of a surface of the shaft or parts of a surface of the bearing, and
carbon nitriding the surface of the shaft or the surface of the bearing or carburizing the surface of the shaft or the surface of the bearing.

* * * * *